United States Patent
Zhang et al.

(10) Patent No.: US 9,796,022 B2
(45) Date of Patent: Oct. 24, 2017

(54) POLLUTION-FREE METHOD FOR RECYCLING IRON-BASED GRINDING WASTE

(75) Inventors: Shengen Zhang, Beijing (CN); Bo Liu, Beijing (CN); Jianjun Tian, Beijing (CN); Dean Pan, Beijing (CN); Bin Li, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 13/587,450

(22) Filed: Aug. 16, 2012

(65) Prior Publication Data

US 2013/0091987 A1    Apr. 18, 2013

Related U.S. Application Data

(63) Continuation of application No. PCT/CN2010/079769, filed on Dec. 14, 2010.

(30) Foreign Application Priority Data

Jul. 19, 2010    (CN) .......................... 2010 1 0230531

(51) Int. Cl.
*B22F 9/00*    (2006.01)
*B22F 3/23*    (2006.01)
(Continued)

(52) U.S. Cl.
CPC .................. *B22F 9/00* (2013.01); *B22F 3/23* (2013.01); *B22F 5/106* (2013.01); *B22F 7/08* (2013.01);
(Continued)

(58) Field of Classification Search
CPC ............ B22F 8/00; C22B 1/005; C22B 1/248
(Continued)

(56) References Cited

U.S. PATENT DOCUMENTS 4,129,443 A * 12/1978 Kaufman .......................... 419/32
4,252,577 A *  2/1981 Malard ............................ 419/23

FOREIGN PATENT DOCUMENTS

CN    1059376    3/1992
CN    1297976    6/2001
(Continued)

OTHER PUBLICATIONS

Abstract of JP01005916A, Jan. 1989.*
(Continued)

*Primary Examiner* — Jie Yang
*Assistant Examiner* — Xiaowei Su
(74) *Attorney, Agent, or Firm* — Novick, Kim & Lee, PLLC; Allen Xue

(57) ABSTRACT

The invention provides a pollution-free reuse method for iron-based grinding waste, involving the technology of recycling economy, with special reference to the metallurgical industry, iron-based grinding waste green recycling technology. The present invention of the iron grinding waste recycling and reuse methods includes degreasing, heat treatment, sieving, matching, and obtains iron-based alloyed powders, which can be used in SHS lined steel pipe, powder metallurgy structural component, magnetic grinding, thermal spray. More than 95% iron-based alloyed powders can be recycled from wide source of iron-based grinding waste. The invention has the advantage of low cost, no secondary pollution and wide application.

6 Claims, 1 Drawing Sheet

(51) Int. Cl.
*B22F 5/10* (2006.01)
*B22F 7/08* (2006.01)
*B22F 8/00* (2006.01)

(52) U.S. Cl.
CPC ............... *B22F 8/00* (2013.01); *Y02P 10/24* (2015.11); *Y02W 30/541* (2015.05)

(58) Field of Classification Search
USPC .......................................................... 75/363
See application file for complete search history.

(56) References Cited

FOREIGN PATENT DOCUMENTS

| CN | 1428459 | 7/2003 |
|---|---|---|
| CN | 1759963 | 4/2006 |
| CN | 1800090 | 7/2006 |
| CN | 101003093 | 7/2007 |
| CN | 101015859 | 8/2007 |
| CN | 101288904 | 10/2008 |
| CN | 101294061 | 10/2008 |
| CN | 101353566 | 1/2009 |
| CN | 101525758 | 9/2009 |
| CN | 101898247 | 12/2010 |
| JP | 01005916 A * | 1/1989 |
| JP | 2006290547 A * | 10/2006 |
| WO | 97/14760 | 4/1997 |

OTHER PUBLICATIONS

Machine translation of JP2006-290547A, Oct. 2006.*
Aerosol surfactant, https://www.cytec.com/, 2008.*
Machine translation of CN1428459A, Jul. 2003.*
Machine translation of CN1297976, Jun. 2001.*
Ruffino et al. Resources, Conservation and Recycling, 2008, vol. 52, p. 1315-1321.*
Machine translation of JP01-005916. Jan. 1989.*
International Search Report of PCT/CN2010/079769 dated Apr. 28, 2011 (6 pages total).

* cited by examiner

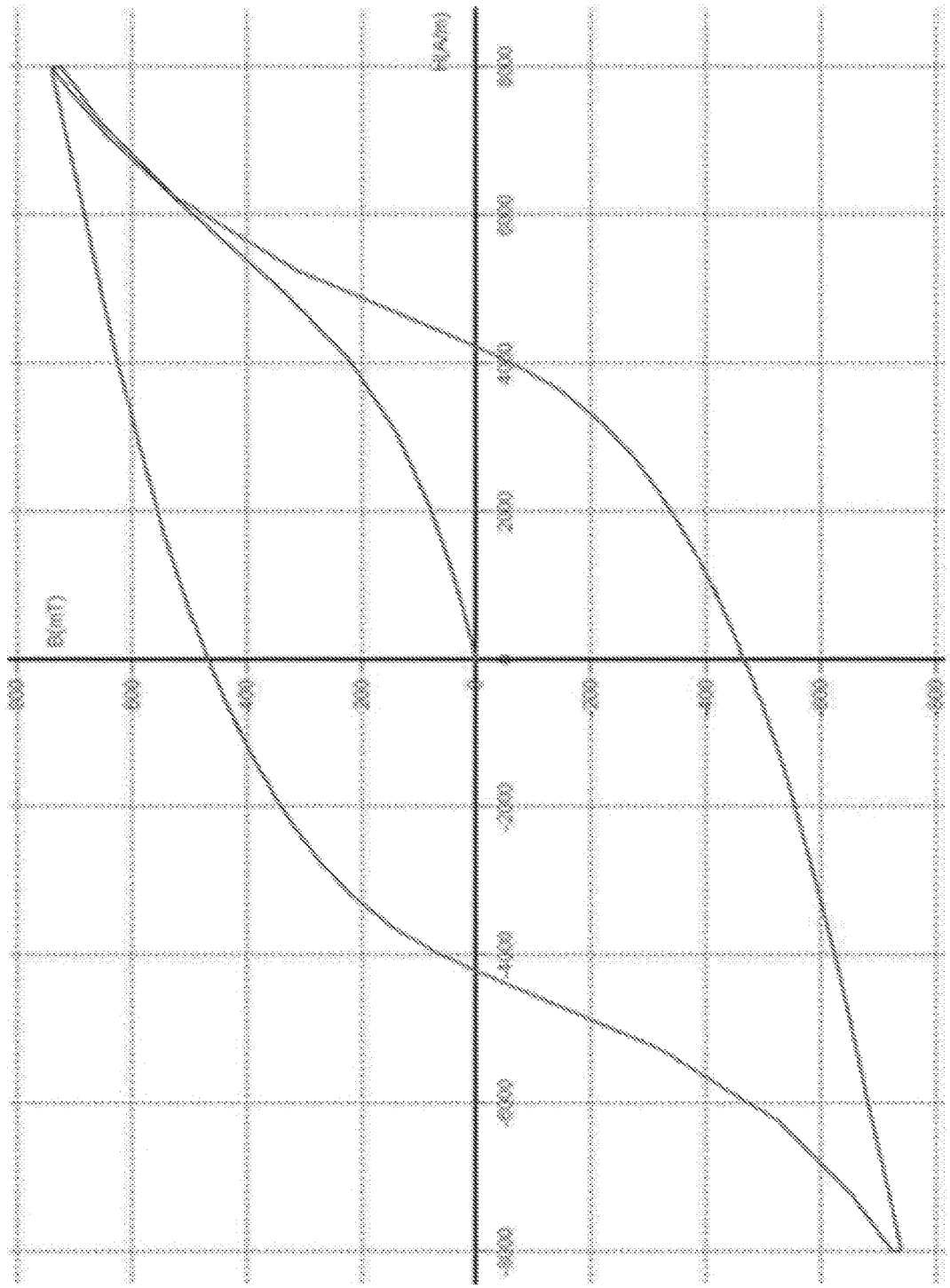

POLLUTION-FREE METHOD FOR RECYCLING IRON-BASED GRINDING WASTE

TECHNICAL FIELD

The field of this invention is the method for recycling iron-based grinding waste. The invention is particularly concerned with the technology of recycling economy.

BACKGROUND

Powder metallurgy is a technology which use metal powders as raw materials, manufacturing metal materials, composite materials and others by forming and sintering technology. Iron powders has been widely used as a vital metal powders's raw materials in powder metallurgy industry. However, with the development of science and technology, people need high performance powder metallurgy materials. So it need to develop high performance iron-based alloyed powders as well as pure iron powders.

The iron-based alloyed powders, being its uniform structure and composition, have been widely used in powder metallurgy materials for decreasing sintering temperature and improving the mechanical properties. There are many manufacturing methods for iron-based alloyed powders such as chemical co-precipitation-co-reduction, atomization, mechanical alloying, electrolytic process etc. Chemical co-precipitation-co-reduction can produce the powders beneath 10 micrometers, which has good liquidity, compactibility and sintering character. However, chemical co-precipitation-co-reduction is complicated, high cost and its products is expensive. Start elements are melted in a medium frequency induction furnace, then high pressure atomized medium water or gas through a atomizing nozzle to smash stream of molten metal, and then the smashed liquid drop take shape of solid particle after refrigeration to obtain the pre-alloyed powders. The alloyed powders produced by atomization have the high alloying extent, good sintering character, low cost of production, but poor compactibility, poor particle distribution and high oxygen content. Iron-based alloyed powders prepared by mechanical alloying and electrolytic also have disadvantage. Therefore, it is very significant to seek for a simple, low cost, and pollution-free process to prepare iron-based alloyed powders.

Iron-based grinding waste contains many iron-based alloyed powders. However, it is difficult to be reused for the abrasive, grinding wheel additives and many iron-based alloyed powders embedded with each other. Iron-based grinding waste are usually piled up results in occupying space, polluting the environment.

SHS (Self-propagating High-temperature Synthesis) is a new technology for preparing materials with the heat from exothermic chemical reaction itself. In fact, SHS is a redox reactions, which aluminum and iron oxide occur oxidation-reduction reactions and obtain high temperature. Reaction products of iron and aluminum oxide will alloy immediately. If centrifugal force is added together with redox reactions, alumina will distribute in the inner surface of the steel pipe, and iron will distribute in the between steel pipe and alumina ceramic layer for the density difference of alumina and iron.

At present, the research and patents of SHS steel pipe are focused on the type of additives and its quantities and the control of materials cost. For example, Chinese Patent 90107244.3 describes a method of manufacturing corrosion resistant and friction resistant ceramic SHS steel pipe. In the process, the additive is $SiO_2$ and one or two kind of alkali metal oxides ($Na_2O$, $K_2O$, $Li_2O$) and one or two kind of alkaline-earth metallic oxides (MgO, CaO, BaO). Then the additive is added with $Al+Fe_2O_3$ (or $Fe_3O_4$). Chinese Patent 200510136673.0 describes that the materials mainly include Al, $Fe_2O_3$ and accessory $SiO_2$, feldspar fine powders, quartz fine powders, fluorite fine powders and 0.5-1.5 wt % $Al_2O_3$ for manufacturing ceramic composite steel pipe. The materials are acid slag, Al and $SiO_2$ is known for preparing ceramic-lined steel pipe, as described in Chinese patent 01139227.4.

In this invention, aluminum powders and iron-based alloyed powders recycled from iron-based grinding waste can be as raw materials used in SHS lined steel pipe. Compared with Chinese patents 90107244.3 and 200510136673.0, the raw materials is iron-based alloyed powders, instead of $Fe_2O_3$ (or $Fe_3O_4$) powders. It can reduce the cost of SHS lined steel pipe. Compared with Chinese patent 01139227.4, iron-based alloyed powders have higher total iron content than acid slag. In addition, iron-based alloyed powders contain some $Al_2O_3$ and $SiO_2$, which can be melted in SHS and control the high temperature, to increase the thickness of ceramic layer in SHS steel pipe to prevent steel pipe from deformation. $SiO_2$ can decrease the crystallization temperature of $Al_2O_3$ primary phase and increase ceramic melt time and promote gas phase escaping. So this invention can enhance the quality of ceramic layer.

Structural component mainly participates in machine operation, bearing tension, compression, torsion, impaction, and other combined stress, and rubbing against dual component. Powder metallurgy technology can manufacture near fine form widely used iron-based structural components using iron powders and its alloyed powders.

At present, most references and patents focus on the improvement of alloy recipe, preparing alloyed powders described in above-mentioned. Chinese patent 200710098524.9 describes a method for preparing high-performance iron-based alloyed powders used in laser welding, adapting precipitation precursor reduction and mechanical alloying process. In addition, some scholars try to improve the present preparation method in decreasing the materials cost terms. Chinese patent 200510048519.8 describes cryogenic treatment process under −50° C. to −198° C., and thereafter smashing alloy to massive of diameter 3~5cm by the inert-gas protection jaw crusher, then grinding to the required granularity by the inert-gas protection ball grinding mill with sieve. This method can obtain alloyed powders at low finished cost, and its cost just is 1.1~1.3 times of metal materials. Chinese patent 200910043135.5 describe a process for manufacturing cobalt pre-alloyed powders by recycling synthesized diamond waste powders accelerant and other secondary metal, adding some iron and cobalt, electrolyzing and hydrogen reducing. However, no references and patents describe a method for recycling iron-based alloyed powders from iron-based grinding waste.

This invention describes a process for recycling iron-based alloyed powders from iron-based grinding waste and for using in SHS lined steel pipe, powder metallurgy structural component, magnetic grinding, thermal spray with the iron-based alloyed powders. It is suitable for recycling economy.

Magnetic grinding is a new machining technology which can machine high precision components. Magnetic abrasive is grinding the surface of components when the moving magnetic field is being applied. It has many advantages such as three-dimensional grinding, high accuracy, small deformation, less temperature rising and high efficiency. Magnetic abrasive mainly consists of matrix and abrasive grains.

Magnetic abrasive is made from ferro-magnetic materials and abrasive grains as described in references and patents. Chinese patent 200710075464.9 describes a magnetic abrasive made from steel needle (diameter 0.5 mm~2 mm, length 5 mm~20 mm), steel ball (diameter 0.5 mm~2 mm), ceramic powders (corundum, kaolin, micro silica powders). A special structure of magnetic abrasive is core-shell structure, which the core is granulated magnetic materials and the shell is a ceramic coating or a plastic coating, as described in Chinese patent 200810031570.1. This kind of magnetic abrasive can improve the machining efficiency. Chinese patent 00136573.8 describes a method for preparing magnetic abrasive by hot-press sintering. The raw materials is iron powders, brown corundum powders, white corundum powders, CBN, diamond micro-powders and other ultra-hard abrasive. However, there is no report about preparing magnetic abrasive based on iron-based grinding waste.

Thermal spray is a surface strengthening technology, by heating the powders or filiform metal materials or nonmetal materials to molten or semi-molten by some kind of heat producer (such as voltaic arc, plasma spray or blaze, etc), then spraying it to pretreated matrix's surface at a certain speed by means of flame flow itself or compressed air, depositing and then forming surface coating with various function.

Thermal spray powders play an important role among thermal spray materials. There are two methods for preparing thermal spray powders. One is mixture of element powders, the other is pre-alloyed powders. Thermal spray pre-alloyed powders includes Ni-based, iron-based and Co-based alloyed powders.

Ni-based self-fluxing alloyed powders consists of chromium, boron, silicon, carbon, copper, molybdenum etc. alloyed powders are widely applied in self-fluxing spray welding alloyed powders for its low melting point, good self-fluxing, anti-corrosion, anti-friction, heat-resistance, anti-oxidation and so on. There are two kinds of iron-based alloyed powders, one is stainless steel type, which include major nickel and chromium; the other is high-chromium iron type, which includes major chromium and carbon. Co-based self-fluxing alloyed powders, which consist of chromium, tin, nickel, boron, silicon, etc, has a good properties of high-temperature behavior, red hardness, anti-friction and anti-oxidation.

Ni-based and iron-based thermal spray alloyed powders are shown in table 1.

TABLE 1

| Mark | C | B | Si | Cr | Fe | Co | Ni | W | Mo |
| --- | --- | --- | --- | --- | --- | --- | --- | --- | --- |
| Ni-25 | ≤0.2 | 1.0~2.0 | 3.0~4.5 | — | ≤8 | — | bal. | — | — |
| Ni-45 | 0.3~0.7 | 1.5~3.5 | 2.5~4.5 | 14~17 | ≤14 | 8~16 | bal. | — | — |
| Ni-60 | 0.6~1.0 | 2.4~4.5 | 3.0~5.0 | 14~17 | ≤15 | — | bal. | — | — |
| Fe-30 | 0.3~0.6 | 1.5~2.5 | 2.5~3.5 | 10~16 | bal. | — | 26~32 | — | — |
| Fe-40 | 0.1~0.2 | 1.5~2.5 | 1.5~2.5 | 17~19 | bal. | 1~2 | 7~9 | 1~2 | 1~2 |

There are three advantages of iron-based alloyed powders recycled from processing iron-based grinding waste Ni60 mixture powders used in thermal spray. First, iron-based alloyed powders contains lots of alloy elements such as Cr, Ni, Mo, Mn etc. Second, iron-based alloyed powders contains some micro abrasive. During thermal spraying, abrasive grains and iron-based grains will drop out since they embed with each other and distribute more uniformly. So it has good anti-friction. Third, the melting point is not high and beneficial to coating and matrix can combine better.

SUMMARY

This present invention provides a method for recycling iron-based grinding waste without pollution. The iron-based alloyed powders can be gotten from the iron-based grinding waste and can be used in SHS lined steel pipe, powder metallurgy components, magnetic abrasive or thermal spraying coatings. The present invention describes how to degrease iron-based grinding waste, how to treat and the iron-based alloyed powders. The detail steps are as follows.

(1) using surfactant to degrease the oil included in iron-based grinding waste;

(2) heat treatment at 200° C. to 800° C. for drying, wiping out and recycling organics, then obtain iron-based alloyed powders;

(3) Sieving the iron-based alloyed powders in −40~+400 mesh;

(4) applying the iron-based alloyed powders in SHS lined steel pipe, powder metallurgy structural component, magnetic grinding, or thermal spraying coatings.

Step (1) in which said degreasing the oil included in iron-based grinding waste is that the surface active agent is Diocty Sodium Sulfosuccinate and the quantity is 1% to 3% to the iron-based grinding materials.

Step (4) in which applying the iron-based alloyed powders in SHS lined steel pipe is that the ratio of iron-based alloyed powders to aluminum powders is between 3:1 and 5:1.

Step (4) in which applying the iron-based alloyed powders in powder metallurgy structural component is that the iron-based alloyed powder particles distribution, by weight percentage, is 20%~45% (−240~+400 mesh), 30%~60% (−160~+240 mesh), 10%~15% (−80~+160 mesh) and 5%~10% (−40~+80 mesh).

Step (4) in which applying the iron-based alloyed powders in magnetic grinding is that the abrasive is aluminium oxide, silicon carbide or their mixture and the mass ratio of the abrasive to the iron-based alloyed powders is 1:4~1:8.

Step (4) in which applying the iron-based alloyed powders in thermal spraying coatings is that the mass ratio of the iron-based alloyed powders to Ni60 powers is 4:1~6:1.

The present invention has some advantages as follows.

1. The process is simple and the sources of the raw materials are wide and cheap.

2. The iron-based alloyed powders can be entirely used directly. There is low cost and non-pollution.

3. The iron-based alloyed powders recycled from the iron-based grinding waste are the raw materials of powder metallurgy components.

4. The iron-based alloyed powders can be used in SHS lined steel pipe as well as $Fe_2O_3$. Because there are some $Al_2O_3$ and $SiO_2$ in the iron-based alloyed powders, the SHS reaction temperature can be restrained for the melt of $Al_2O_3$ and $SiO_2$. The re-crystallization temperature of $Al_2O_3$ is decreased for $SiO_2$. The ceramic melt point can be decreased and the solidification time can be prolonged. It benefits for increasing the quality of the ceramic coating of the SHS lined steel pipe.

5. The iron-based alloyed powders used for magnetic abrasive is not described in any publications. The magnetic abrasive describes in the present invention is low price.

6. In the present invention, there are 3 advantages of the iron-based alloyed powders mixed by Ni60 powders for using of thermal spraying coatings. First, there are many steel alloyed particles in the iron-based alloyed powders. It is cheaper than other alloyed powders. Second, there are some micro powders in the iron-based alloyed powders. So the thermal spraying coatings are more uniformly. Third, Ni60 powders contain boron and silicon elements, which benefit the coating of the iron-based alloyed powders.

BRIEF DESCRIPTION OF DRAWINGS

The FIGURE is a graph illustrating hysteresis loop and magnetization curve of the iron-based alloyed powders.

DETAILED DESCRIPTION

EXAMPLE 1

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%.

EXAMPLE 2

Mix the iron-based grinding waste with the surface active agent Diocty Sodium Sulfosuccinate uniformly with their mass ratio being 100:3. Then pour water to them, stir, and wash. Put the washed waste in oven at 800° C. for 0.5 h, and we get the iron-based alloyed powders with TFe=70.2%.

EXAMPLE 3

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Sieve it to get the −40~+400 iron-based alloyed powders. Mix the reducing agent aluminum powders with the sieved iron-based alloyed powders uniformly with the mass ratio 1:3, then put the mixture as the raw materials of the SHS lined steel pipe in a steel pipe with φ80 mm, 4 mm thick and 150 mm long. Fix the steel pipe to the tube machine and turn on it, light the mixture with tungsten filament. After the reaction, there is a ceramic coating with smooth surface and no flaw distributed in the inner surface of the steel pipe.

EXAMPLE 4

Mix the iron-based grinding waste with the surface active agent Diocty Sodium Sulfosuccinate uniformly with their mass ratio being 100:3. Then pour water to them, stir, and wash. Put the washed waste in oven at 800° C. for 0.5 h, and we get the iron-based alloyed powders with TFe=70.2%. Sieve it to get the −40~+400 iron-based alloyed powders. Mix the reducing agent aluminum powders with the sieved iron-based alloyed powders uniformly with the mass ratio 1:4, and put the mixture as the raw materials of the SHS lined steel pipe in a steel pipe with φ80 mm, 4 mm thick and 150 mm long. Fix the steel pipe to the tube machine and turn on it, light the mixture with tungsten filament. After the reaction, there is a ceramic coating with smooth surface and no flaw distributed in the inner surface of the steel pipe.

EXAMPLE 5

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Sieve it to get the −200~+300 iron-based alloyed powders. Mix the reducing agent aluminum powders with the sieved iron-based alloyed powders uniformly with the mass ratio 1:5, and put the mixture as the raw materials of the SHS lined steel pipe in a steel pipe with φ80 mm, 4 mm thick and 150 mm long. Fix the steel pipe to the tube machine and turn on it, light the materials with tungsten filament. After the reaction, there is a ceramic coating with smooth surface and no flaw distributed in the inner surface of the steel pipe.

EXAMPLE 6

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Then interlot the iron-based alloyed powders with different particle size as the mass ratios below: 5% for −40~+80 mesh iron-based alloyed powders, 10% for −80~+160 mesh iron-based alloyed powders, 50% for −160~+240 mesh iron-based alloyed powders, 35% for −240~+400 mesh iron-based alloyed powders. After interlotted, compact the powders and sinter them in a hydrogen atmosphere to get powder metallurgy components.

EXAMPLE 7

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Then interlot to these iron-based alloyed powders with different particle size as the mass ratios below: 5% for −40~+80 mesh iron-based alloyed powders, 15% for −80~+160 mesh iron-based alloyed powders, 40% for −160~+240 mesh iron-based alloyed powders, 40% for −240~+400 mesh iron-based alloyed powders. After interlotted, compact the powders and sinter them in a hydrogen atmosphere to get powder metallurgy components.

EXAMPLE 8

Mix the iron-based grinding waste with the surface active agent Diocty Sodium Sulfosuccinate uniformly with their mass ratio being 100:3. Then pour water to them, stir, and wash. Put the washed waste in oven at 200° C. for 2 h, and we get the iron-based alloyed powders with TFe=81.6%. Then interlot to these iron-based alloyed powders with different particle size as the mass ratios below: 10% for −40~+80 mesh iron-based alloyed powders, 10% for −80~+

160 mesh iron-based alloyed powders, 60% for −160~+240 mesh iron-based alloyed powders, 20% for −240~+400 mesh iron-based alloyed powders. After interlotted, compact the powders and sinter them in a hydrogen atmosphere to get powder metallurgy components.

EXAMPLE 9

Mix the iron-based grinding waste with the surface active agent Diocty Sodium Sulfosuccinate uniformly with their mass ratio being 100:3. Then pour water to them, stir, and wash. Put the washed waste in oven at 200° C. for 2 h, and we get the iron-based alloyed powders with TFe=81.6%. Then interlot to these iron-based alloyed powders with different particle size as the mass ratios below: 10% for −40~+80 mesh iron-based alloyed powders, 15% for −80~+160 mesh iron-based alloyed powders, 30% for −160~+240 mesh iron-based alloyed powders, 45% for −240~+400 mesh iron-based alloyed powders. After interlotted, compact the powders and sinter them in a hydrogen atmosphere to get powder metallurgy components.

EXAMPLE 10

Mix the iron-based grinding waste and the surface active agent Diocty Sodium Sulfosuccinate uniformly with their mass ratio being 50:1. Then pour water to them, stir, and wash. Put the washed waste in oven at 200° C. for 2 h, and we get the iron-based alloyed powders with TFe=81.6%. Because the iron-based alloyed powders has a good magnetic property, as showed in the FIGURE, it is suit for manufacturing magnetic abrasive. Mix the sieved iron-based alloyed powders (+140 mesh) with abrasive powders $Al_2O_3$ (+400 mesh) with the mass ratio 4:1 in anhydrous ethanol for 2 h. Dry the mixed powders and then put epoxy resin as the caking agent and polyamide resin as the curing agent into it. The mass of epoxy resin to $Al_2O_3$ is 1/3, and the mass of polyamide resin to the epoxy resin is 1/3. Mix all of them uniformly, compact them to bulks, solidify for 24 h in room temperature and smash them into magnetic abrasive powders.

EXAMPLE 11

Mix the iron-based grinding waste and the surface active agent Diocty Sodium Sulfosuccinate uniformly with their mass ratio being 50:1. Then pour water to them, stir, and wash. Put the washed waste in oven at 200° C. for 2 h, and we get the iron-based alloyed powders with TFe=81.6%. Because the iron-based alloyed powders has a good magnetic property, as showed in the FIGURE, it is suit for manufacturing magnetic abrasive. Mix the sieved iron-based alloyed powders (+140 mesh) with abrasive powders SiC (+400 mesh) with the mass ratio 5:1 in anhydrous ethanol for 2 h. Dry the mixed powders and then put epoxy resin as the caking agent and polyamide resin as the curing agent into it. The mass of epoxy resin to SiC is 1/3, and the mass of polyamide resin to the epoxy resin is 1/3. Mix all of them uniformly, compact them to bulks, solidify for 24 h in room temperature and smash them into magnetic abrasive powders.

EXAMPLE 12

Mix the iron-based grinding waste and the surface active agent Diocty Sodium Sulfosuccinate uniformly with their mass ratio being 50:1. Then pour water to them, stir, and wash. Put the washed waste in oven at 200° C. for 2 h, and we get the iron-based alloyed powders with TFe=81.6%. Because the iron-based alloyed powders has a good magnetic property, as showed in the FIGURE, it is suit for manufacturing magnetic abrasive. Mix the sieved iron-based alloyed powders (+140 mesh) with abrasive powders SiC (+400 mesh) and $Al_2O_3$ (+400 mesh) with the mass ratio 20:2:1 in anhydrous ethanol for 2 h. Dry the mixed powders and then put epoxy resin as the caking agent and polyamide resin as the curing agent into it. The mass of epoxy resin to the sum of the iron-based alloyed powders's and $Al_2O_3$ is 1/3, and the mass of polyamide resin to the epoxy resin is 1/3. Mix all of them uniformly, compact them to bulks, solidify for 24 h in room temperature and smash them into magnetic abrasive powders.

EXAMPLE 13

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Sieve the iron-based alloyed powders to get −200~+300 mesh powders. Mix the sieved powders with $Ni_{60}$ powders with mass ratio 4:1. The mixed powders are the spraying materials for thermal spraying coating. Cut the No. 45 steel (Chinese standard) into 30 mm×15 mm×4 mm pieces. Remove the oxidations of the steel and clean the surface of the steel. Spray the mixed powders on the cleaned steel by HVOF to get good spraying coating.

EXAMPLE 14

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Sieve the iron-based alloyed powders to get −200~+300 mesh powders. Mix the sieved powders with $Ni_{60}$ powders with mass ratio 5:1. The mixed powders are the spraying materials for thermal spraying coating. Cut the No. 45 steel (Chinese standard) into 30 mm×15 mm×4 mm pieces. Remove the oxidations of the steel and clean the surface of the steel. Spray the mixed powders on the cleaned steel by HVOF to get good spraying coating.

EXAMPLE 15

Mix the iron-based grinding waste with the surface active agent Diocty Sodium Sulfosuccinate uniformly with their mass ratio being 100:1. Then pour water to them, stir, and wash. Put the washed waste in oven at 200° C. for 2 h, and we get the iron-based alloyed powders with TFe=81.6%. Sieve the iron-based alloyed powders to get −200~+300 mesh powders. Mix the sieved powders with $Ni_{60}$ powders with mass ratio 6:1. The mixed powders are the spraying materials for thermal spraying coating. Cut the No. 45 steel (Chinese standard) into 30 mm×15 mm×4 mm pieces. Remove the oxidations of the steel and clean the surface of the steel. Spray the mixed powders on the cleaned steel by HVOF to get good spraying coating.

What is claimed is:
1. A method of recycling an iron-based grinding waste, comprising:

obtaining an iron-based grinding waste comprising iron, $SiO_2$, and $Al_2O_3$;

mixing a surfactant with the iron-based grinding waste and washing the mixture in water;

heating the washed iron-based grinding waste at 200° C. to 800° C. to obtain a first iron-based alloyed powder;

sorting the first iron-based alloyed powder according to powder particle sizes to obtain a plurality of iron-based alloyed powders; and mixing the plurality of iron-based alloyed powders to obtain a second iron-based alloyed powder; and compacting and sintering the second iron-based alloyed powder in a hydrogen atmosphere to produce a powder metallurgy product, wherein the second iron-based alloyed powder has 20-45 wt % of the powder particles in −240 to +400 mesh, 30-60 wt % of the powder particles in −160 to +240 mesh, 10-15 wt % of the powder particles in −80 to +160 mesh, and 5-10 wt % of the powder particles in −40 to +80 mesh.

2. The method of claim 1, wherein the surfactant is diocty sodium sulfosuccinate and a content of the surfactant is 1% to 3% by mass of the iron-based grinding waste.

3. The method of claim 1, wherein heating the washed iron-based grinding waste is performed at 200° C.

4. The method of claim 1, wherein the second iron-based alloyed powder comprises 70.2% or 81.6% of iron by weight.

5. The method of claim 1, wherein the method does not comprise milling.

6. The method of claim 1, further comprising recycling organics after the heating step.

* * * * *